(12) United States Patent
Phillip

(10) Patent No.: US 9,669,806 B2
(45) Date of Patent: Jun. 6, 2017

(54) AFTERMARKET SIDE WINDOW WIPER APPARATUS AND METHOD FOR A MOTOR VEHICLE

(71) Applicant: Edwin Phillip, Brooklyn, NY (US)

(72) Inventor: Edwin Phillip, Brooklyn, NY (US)

( * ) Notice: Subject to any disclaimer, the term of this patent is extended or adjusted under 35 U.S.C. 154(b) by 145 days.

(21) Appl. No.: 14/799,205

(22) Filed: Jul. 14, 2015

(65) Prior Publication Data

US 2017/0015284 A1    Jan. 19, 2017

(51) Int. Cl.
| | |
|---|---|
| *B08B 7/00* | (2006.01) |
| *B60S 1/56* | (2006.01) |
| *B60J 10/04* | (2006.01) |
| *B60S 1/38* | (2006.01) |
| *B60S 1/42* | (2006.01) |
| B60S 1/04 | (2006.01) |
| E06B 7/00 | (2006.01) |
| E06B 7/14 | (2006.01) |
| E06B 7/098 | (2006.01) |
| B08B 1/00 | (2006.01) |

(52) U.S. Cl.
CPC .............. *B60S 1/566* (2013.01); *B60J 10/04* (2013.01); *B60S 1/38* (2013.01); *B60S 1/42* (2013.01); *B08B 1/00* (2013.01); *B08B 1/006* (2013.01); *B60S 1/0411* (2013.01); *B60S 1/56* (2013.01); *B60S 2001/3829* (2013.01); *B60S 2001/3841* (2013.01); *E06B 7/00* (2013.01); *E06B 7/098* (2013.01); *E06B 7/14* (2013.01)

(58) Field of Classification Search
CPC .... B60S 1/38; B60S 1/56; B60S 1/566; B60S 1/0411; B60S 2001/3841; B60S 2001/3829; E06B 7/00; E06B 7/14; E06B 7/098; B60J 10/04; B08B 1/00; B08B 1/006
See application file for complete search history.

(56) References Cited

U.S. PATENT DOCUMENTS

| | | | |
|---|---|---|---|
| 2,563,252 | A | 8/1951 | Larsen |
| 2,633,380 | A | 3/1953 | Shapiro |
| 2,636,775 | A | 4/1953 | Fineo |
| 2,690,350 | A | 9/1954 | Shapiro |
| 2,697,632 | A | 12/1954 | Shapiro |
| 2,704,689 | A | 3/1955 | Shapiro |

(Continued)

FOREIGN PATENT DOCUMENTS

| | | |
|---|---|---|
| EP | 0486163 A1 | 10/1991 |
| EP | 0489537 A1 | 11/1991 |

(Continued)

*Primary Examiner* — Bibi Carrillo
*Assistant Examiner* — Sharidan Carrillo
(74) *Attorney, Agent, or Firm* — Notaro, Michalos & Zaccaria P.C.

(57) ABSTRACT

A window wiper includes an elongated profile of waterproof flexible material having a base extending under weather stripping for a side vehicle window, a support connected along the base to extend above the weather stripping, a cover connected along the support and extending over the base for covering at least some of the weather stripping and a wiper portion connected along the support and having a resilient wiper area for pressing against the window. A length of adhesive tape is connected along the profile and extends over the base for adhering to the weather stripping to fix the window wiper to the weather stripping.

3 Claims, 5 Drawing Sheets

(56) References Cited

U.S. PATENT DOCUMENTS

| | | |
|---|---|---|
| 2,743,472 A | 5/1956 | Alef |
| 2,899,238 A | 8/1959 | Swanson |
| 4,442,156 A | 4/1984 | Yamaguchi |
| 4,970,102 A | 11/1990 | Guillon |
| 5,005,317 A | 4/1991 | Saint-Louis Augustin et al. |
| 5,085,005 A * | 2/1992 | Yasukawa ............. B60J 10/244 |
| | | 15/250.1 |
| 5,261,188 A | 11/1993 | Vaughan |
| 5,339,488 A | 8/1994 | Maass |
| 5,343,655 A | 9/1994 | Miyakawa et al. |
| 5,433,038 A | 7/1995 | Dupuy |
| 5,870,860 A | 2/1999 | Heller |
| 5,913,762 A | 6/1999 | Matsumoto |
| 5,970,659 A | 10/1999 | Oord |
| 6,141,854 A | 11/2000 | Mueller et al. |
| 7,171,785 B1 | 2/2007 | Kelly et al. |
| 8,087,712 B2 * | 1/2012 | Svengalis ............. B26B 27/002 |
| | | 15/236.02 |
| 8,127,499 B2 | 3/2012 | Lacovoni et al. |
| 2012/0091746 A1 | 4/2012 | Zimmer et al. |
| 2017/0015284 A1 * | 1/2017 | Phillip ................... B60S 1/566 |

FOREIGN PATENT DOCUMENTS

| | | |
|---|---|---|
| EP | 0619199 A2 | 10/1994 |
| EP | 0888941 A1 | 1/1999 |
| FR | 2633660 A1 | 6/1988 |
| GB | 1240441 | 1/1970 |
| GB | 1315148 | 6/1970 |
| IT | MI91A 001663 | 6/1991 |
| JP | 2004-284420 | 10/2004 |

* cited by examiner

AFTERMARKET SIDE WINDOW WIPER APPARATUS AND METHOD FOR A MOTOR VEHICLE

FIELD AND BACKGROUND OF THE INVENTION

The present invention relates generally to the field of motor vehicles, and in particular, to a new and useful wiper apparatus for a driver-side or passenger-side window of a motor vehicle of the type that is meant to open and close, usually vertically, in a side door or side body of the vehicle.

Motor vehicles commonly include side windows that can be opened and closed by movement in the vertical direction. Whether such movable side windows are installed in side doors or in fixed side components of the vehicle body (for example, in the case of recreational vehicles or buses) it is conventional to include factory installed weather stripping that excludes weather from the interior of the door, whether the window is opened or closed. Such weather stripping is commonly referred to as belt weather stripping since it usually includes both interior and exterior components that allow a vertically movable window pane to move up and down in the door or side body of the vehicle. See for example U.S. Pat. Nos. 4,442,156; 4,970,102; and 5,005,317, as examples. The prior art includes many other examples.

Such factory installed weather stripping may or may not wipe the surface of the window as it rises and lowers, sufficiently to remove water, fog or mist, in particular, from the outer surface of the window.

U.S. Pat. Nos. 2,636,775; 2,633,380; and 2,704,689, disclose examples of window wiping apparatuses to be installed by the owner of a vehicle as an aftermarket product, which wipe the outer surface of motor vehicle side window panes, as the window panes move in the vehicle door, to remove water, fog or mist. These references generally require the use of screws for attaching the wiping apparatus to the body of a vehicle which are unsightly and/or damage the vehicle in case the apparatus is to be removed.

A need remains for an aftermarket, side widow wiping apparatus that can easily be installed on a vehicle, without damaging the vehicle body, and that effectively wipes the side window of water, fog or mist, when the side window pane is moved, usually, but not always, in a vertical direction.

SUMMARY OF THE INVENTION

It is an object of the present invention to provided a side window wiper apparatus for a vehicle having a side window pane with an outer surface and an inner surface, the side window pane being movable in a slot of a body portion of the vehicle with weather stripping connected to the body portion and extending toward the outer surface of the window.

Another object of the invention is to provide such an apparatus to include an elongated profile member of waterproof flexible material, having a base portion adapted to extend under the weather stripping, a support portion connected along the base portion and adapted to extend above the weather stripping and along a length of the outer surface of the window pane when the window pane is in the slot, a cover portion connected along the support portion and extending over the base portion for covering at least a selected width of the weather stripping when the base portion is under the weather stripping, and a wiper portion connected along the support portion and having a resilient wiper area for pressing against the outer surface of the window pane when the window pane moves in the slot for wiping the outer surface.

A further object of the invention is to provide such an apparatus to include a length of adhesive tape connected along the profile member and extending over the base portion for adhering to the selected width of the weather stripping to fix the apparatus to the weather stripping.

Another object of the invention is to provide such an apparatus wherein the elongated profile member includes a cutting guide in the base portion for cutting the base portion to a reduced width.

The elongated profile member is preferable made of latex rubber but other elastic waterproof material may also be used.

The apparatus also includes a removable cover strip of known character over an adhesive surface of the length of adhesive tape, to be removed before the apparatus is fixed to the weather stripping.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
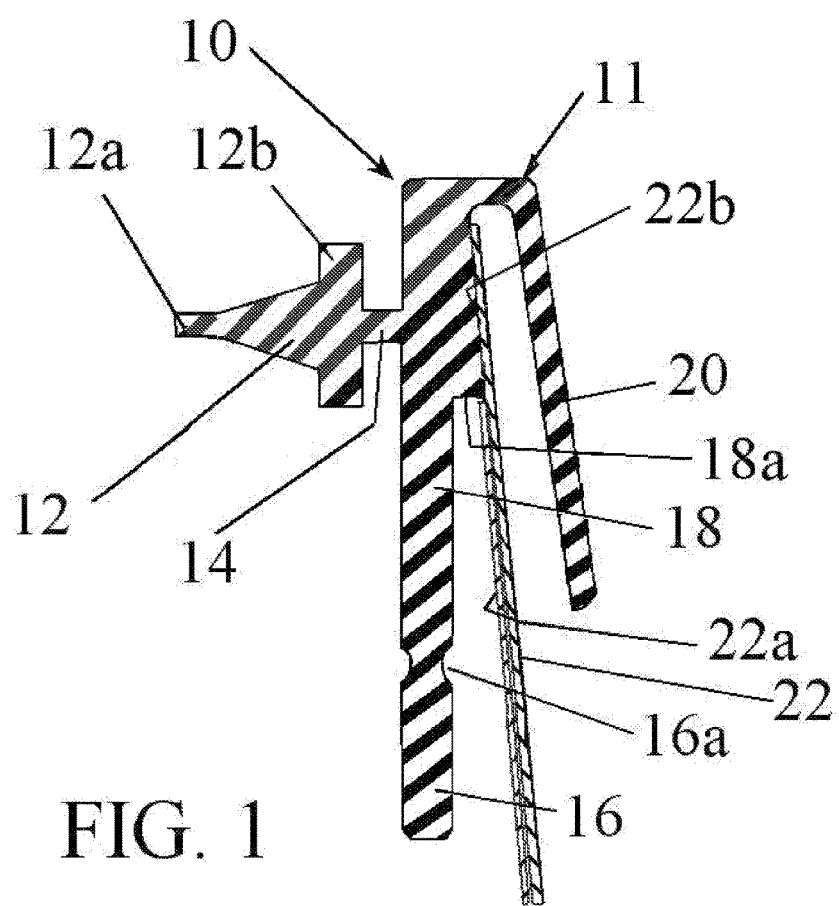
FIG. 1 is a sectional view if a side window wiper apparatus of the invention.
Figure 3:
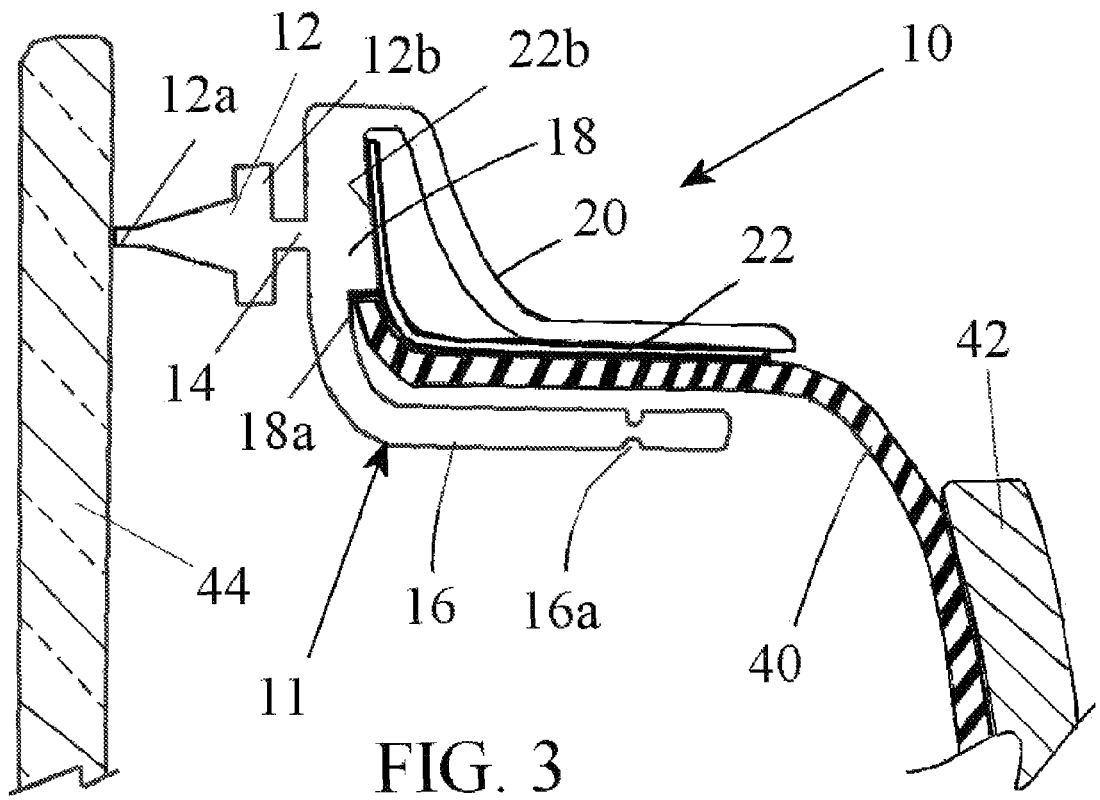
FIG. 3 is a side view of the apparatus of the invention installed on a vehicle for wiping the outer surface of a side window pane of the vehicle.

Referring now to the drawings, in which like reference numerals are used to refer to the same or similar elements, FIGS. 1 and 3 illustrate a side window wiper apparatus 10 of the invention, for a vehicle 42, having a side window pane 44 with an outer surface and an inner surface. The side window pane 44 is movable in a slot of a body portion of the vehicle 42, with factory installed belt weather stripping. Only the exterior portion 40 of the belt weather stripping is shown, and it is connected to the body portion and extends toward the outer surface of the window pane 44 as shown in FIG. 3.

The apparatus of the invention comprises an elongated profile member 11 of waterproof flexible material, having a base portion 16 adapted to extend under the weather stripping 40, a support portion 18 connected along the base portion 16 and adapted to extend above the weather stripping and along a length of the outer surface of the window pane 44 when the window pane moves in the slot, a cover portion 20 connected along the support portion 18 and extending over the base portion 16 for covering at least a selected width of the weather stripping 40 when the base portion 16 is under the weather stripping, and a wiper portion 12 connected along the support portion 18 and having a resilient wiper area 12a for pressing against the outer surface of the window pane when the window pane is in the slot for wiping the outer surface when the window pane moves in the slot.

For connecting the apparatus to a vehicle without damage to the vehicle in case the apparatus it to be removed, or to periodically install a new side window wiper apparatus as is usual with front windshield wiper blades, the apparatus of the invention also includes a length of adhesive tape 22 connected along the profile member 11 and extending over the base portion 16 for adhering to the selected width of the weather stripping 40 to fix the apparatus to the weather stripping 40. To connect the adhesive tape 22 to the profile 11, an uncovered strip 22b of the adhesive surface if tape 22 is pressed against a surface of support portion 18 that is under cover portion 20 as shown in FIGS. 1 and 3. As will be explained below, a reminder of the adhesive surface of tape 22 is covered by a removable cover strip 22a.

Figure 2:
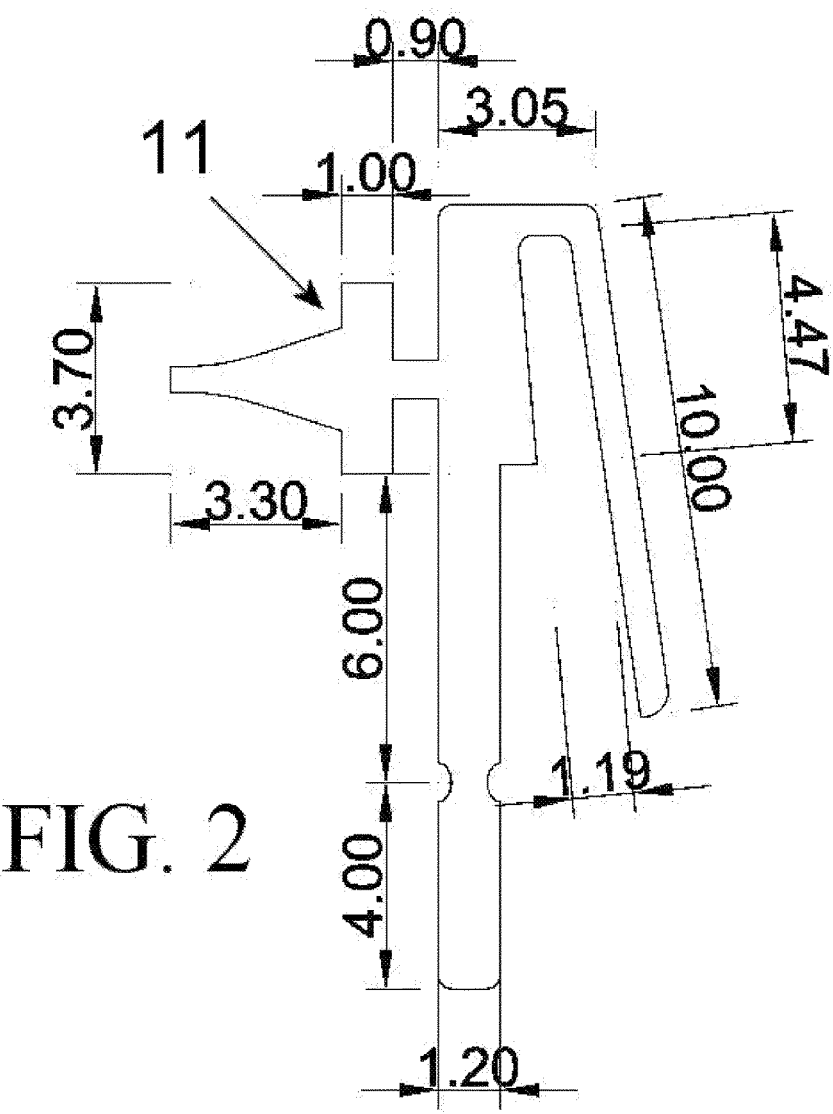
FIG. 2 is a side view of an elastic profile member of the invention, with non-limiting, exemplary dimensions shown in millimeters.

As shown in FIG. 2, the profile 11 has selected dimensions, shown in millimeters, which are preferred for most model automobiles but may be varied for vehicles of different types or sizes of belt weather stripping to which the apparatus of the invention is to be engaged. The elongated profile member 11 is about 24 to 30 inches (about 610 mm to 910 mm) long to fit most vehicles and may be cut to length for a particular vehicle. Profile member 11 is preferable made of latex rubber but any suitable, elastic, waterproof material can be used.

The profile member or profile 11 also advantageously includes a cutting guide 16a in the form of a recess along one or both surfaces of the base portion 16, so that the base portion can be cut to a reduces width to fit fully under weather stripping 40 of less width. Multiple parallel cutting guides may also be provided. Other types of cutting guides may also be provided, however, such as one or more marked parallel lines, score lines, perforated lines or other guides to help the user cut a straight line along the base portion 16.

The side window wiper apparatus of the invention also includes a removable cover strip 22a, made of known composition and surface type that can be removed from an adhesive surface of the tape 22. Cover strip 22a lays over and is removably adhered to the adhesive surface of the length of adhesive tape 22 to be removed before the apparatus is fixed to the weather stripping 40. The cover strip is narrower in width than the tape so that the remaining width or strip 22b of the adhesive surface of the tape 22, can be adhered to the surface of support portion 18 under the cover portion 20 as shown in FIGS. 1 and 3, to firmly attach the tape 22 to the profile 11.

The wiper portion 12 is a wedge and has a straight edge, rectangular portion forming the resilient wiper area 12a. A bridge connection 14 is provided between the wider base of the wiper portion 12, and the support portion 18 on a surface of the support portion that is opposite the cover portion 20. Thin bridge 14, allows the wiper portion 12 to pivot back and forth with respect to the support portion 18, as the window pane 44 changes direction of movement in the slot. This tilts the wiper area 12a first one way, then the other, to bring a corner of the rectangular wiper area 12a at the narrow end of the wedge shaped wiper 12, against the window pane surface, to increase the wiping effect and efficiency.

Figure 4:
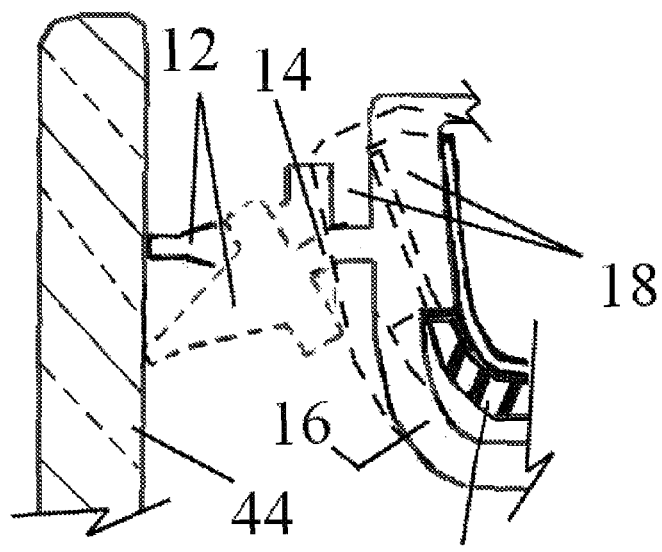
FIG. 4 is a partial view of the apparatus of the invention showing how the wiper pivots when a side window pane of the vehicle moves.

To further improve wiping effectiveness, the wiper portion 12 is a wedge and has a tapered straight edge portion forming the resilient wiper area 12a and a rectangular carrying portion 12b that is wider than a base of the wedge, the bridge connection 14 being connected to the wider carrying portion 12b. The wider carrying portion 12b acts like a fulcrum between the wiper 12 and the support portion 18, to increase the force exerted by the wiper area 12a against the window pane 44, when the wiper 12 pivots about the bridge 14 as the window pane changes direction of movement in the slot. FIG. 4 illustrates this effect. With the widow pane moving downwardly, wiper 12 will pivot downwardly to the broken line position. Because base portion 16 is captured under weather stripping 40, and due to the elastic resiliency of the profile 11 material and the weather stripping 40 material, the support portion 18 will also bend toward the window pane 44 as also shown in broken line, and further enhance the wiping effect. Upward movement of the window pane pivoted the wiper upwardly but the effect is the same.

The support portion 18 also includes a bumper step 18a adapted to engage an edge of the weather stripping 40 when the base portion 16 extends fully under the weather stripping 40. This helps secure the engagement between the apparatus of the invention and the existing belt weather stripping and further advance the effectiveness of the wiping operation for the exterior surface of the side window pane.

The invention also includes a method for wiping a side window pane 44 of a vehicle comprising providing the elongated profile member 11 with its features identified above and to which the length of adhesive tape 22 with its cover strip 22a is attached, placing the base portion 16 under the weather stripping 40, and adhering the adhesive tape 22 to the selected width of the weather stripping 40 after having removed the cover strip 22a, for fixing the profile to the weather stripping 40.

Figure 5:
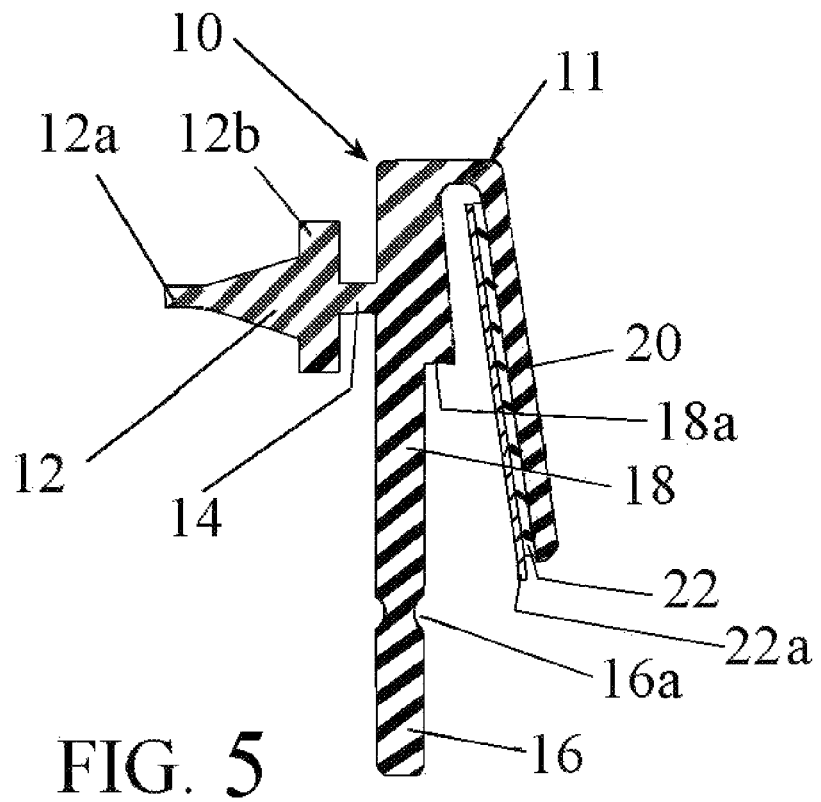
FIG. 5 is a view similar to FIG. 1 of a second embodiment of the invention.
Figure 6:
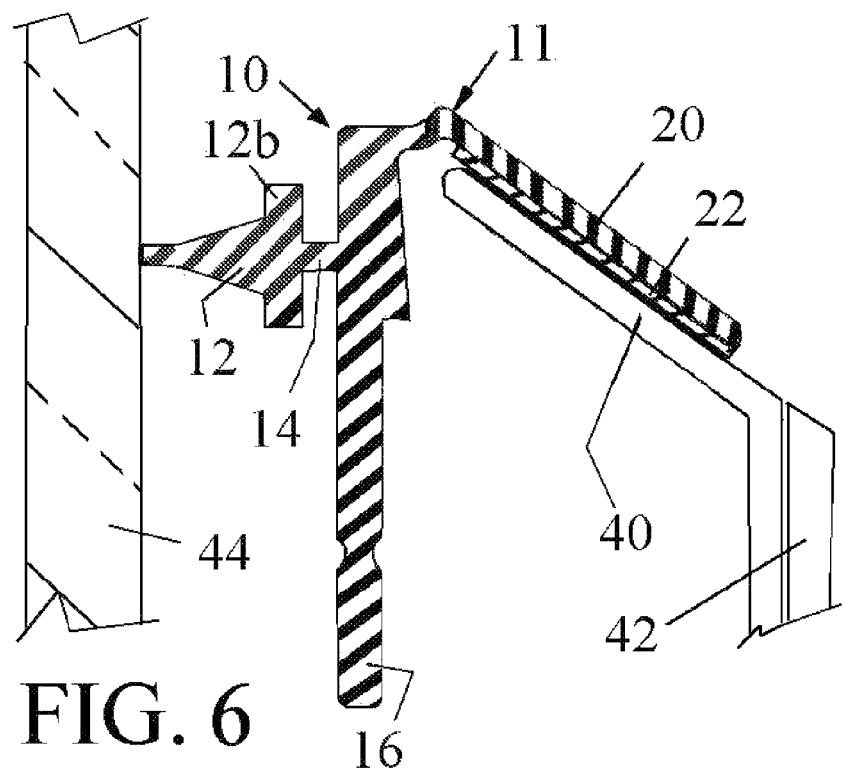
FIG. 6 is a view similar to FIG. 3, of the second embodiment in use.

Referring now to FIGS. 5 and 6 the side window wiper apparatus 10 of the invention has the same parts as the embodiment of FIG. 1, except that for connecting the apparatus to a vehicle without damage to the vehicle or to periodically install a new side window wiper apparatus as needed, the apparatus includes a length of adhesive tape 22 connected by one of its adhesive surfaces to and along an interior surface of the cover portion 20. The opposite adhesive surface of tape 22 is covered by a removable cover strip 22a.

Figure 7:
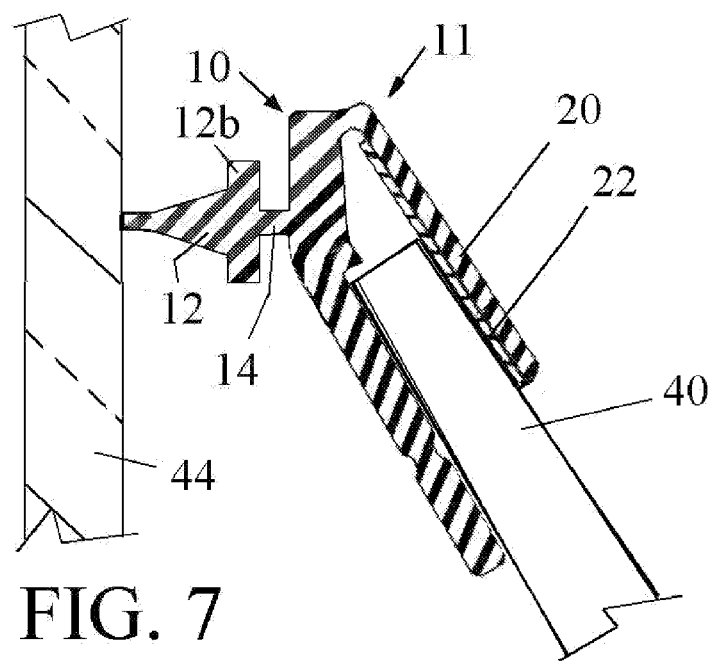
FIG. 7 is a view similar to FIG. 6, of the second embodiment in a different use position.

To install the apparatus of FIG. 5 to a vehicle, as shown in FIG. 6, cover strip 22a is removed and the exposed adhesive surface of tape 22 is applied and adhered to the upper surface of the existing vehicle weather stripping 40 that is mounted to the vehicle body 42. In this way the resilient wiper area 12a if wiper 12 is pressing against the outer surface of the window pane 44 for wiping the outer surface when the window pane moves up and down in its slot. The base portion 16 may be captured under vehicle weather stripping 40 as in the embodiment of FIGS. 1 and 3 and as shown on FIG. 7, or, as shown in FIG. 6, it may extend down into the space between the body part 42 and the window pane 44.

While a specific embodiment of the invention has been shown and described in detail to illustrate the application of the principles of the invention, it will be understood that the invention may be embodied otherwise without departing from such principles.

What is claimed is:

1. A method for wiping a side window pane of a vehicle, the side window pane with an outer surface and an inner surface and being movable in a slot of a body portion of the vehicle, with weather stripping connected to body portion and extending toward the outer surface of the window, the method comprising:

providing an elongated profile member of waterproof flexible material, having a base portion extending under the weather stripping, a support portion connected along the base portion and extending above the weather stripping and along a length of the outer surface of the window pane when the window pane is in the slot, a cover portion connected along the support portion and extending over the base portion for covering at least a selected width of the weather stripping when the base portion is under the weather stripping, and a wiper portion connected along the support portion and having a resilient wiper area for pressing against the outer surface of the window pane for wiping the outer surface when the window pane moves in the slot; and a length of adhesive tape connected along the profile member and extending over the base portion for adhering to the selected width of the weather stripping to fix the elongated profile member to the weather stripping;

placing the base portion under the weather stripping;

adhering the adhesive tape to the selected width of the weather stripping for fixing the profile member to the weather stripping; and wiping the outer surface of the window pane by pressing the resilient wiper area against the outer surface of the window pane as the window pane is raised or lowered vertically in the slot.

2. The method of claim 1, wherein the elongated profile member includes a cutting guide in the base portion and cutting the base portion along the cutting guide to fit under weather stripping of selected width.

3. The method of claim 1, including a cover strip over the length of adhesive tape, and removing the cover strip before adhering the tape to the weather stripping.

* * * * *